Jan. 3, 1961 C. B. STAIR 2,966,965
TRAILER BRAKE ACTUATOR
Filed Feb. 26, 1957 2 Sheets-Sheet 1
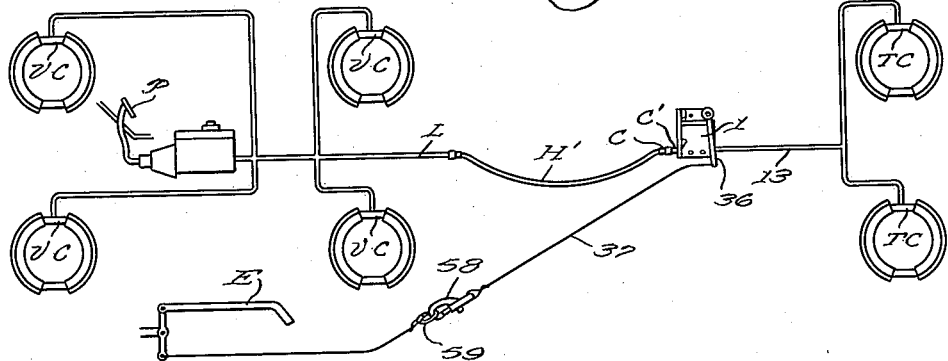
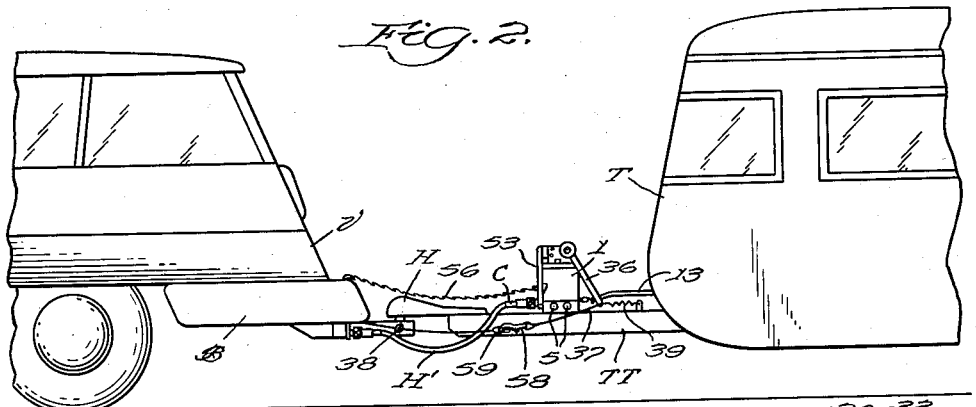
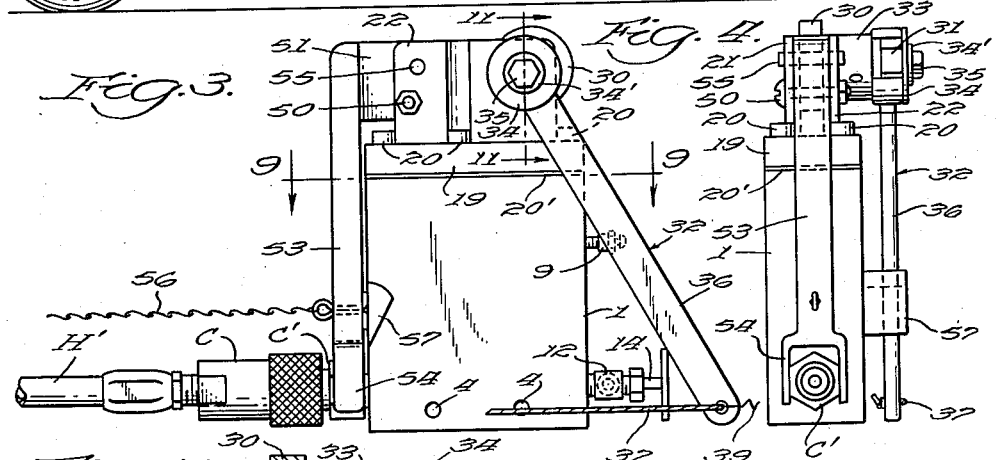
INVENTOR.
Carlyle B. Stair.
BY
Harold J. Vescoute
Atty.

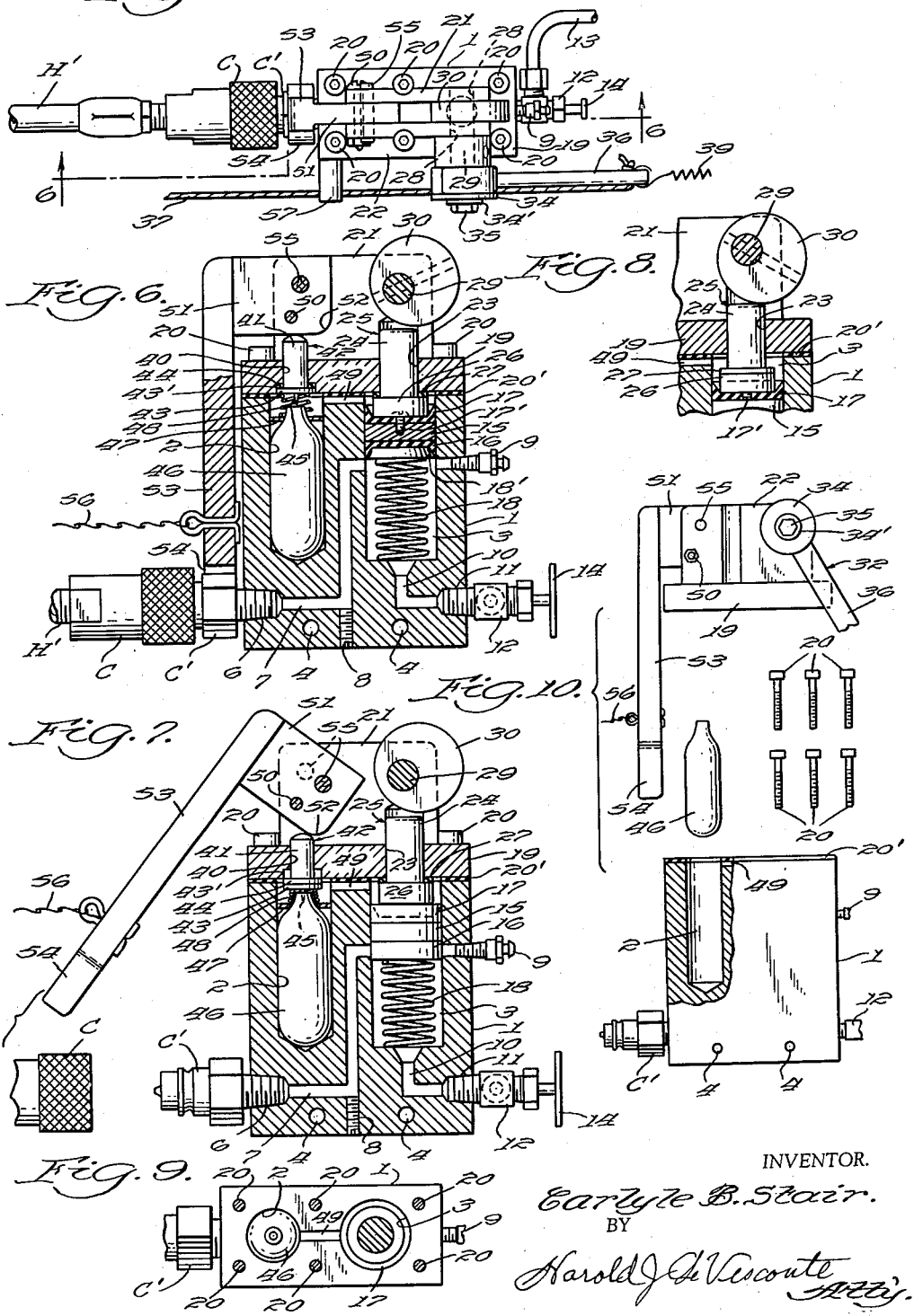

United States Patent Office 2,966,965
Patented Jan. 3, 1961

2,966,965

TRAILER BRAKE ACTUATOR

Carlyle B. Stair, 3109 Buckingham Road,
Glendale 6, Calif.

Filed Feb. 26, 1957, Ser. No. 642,499

11 Claims. (Cl. 188—112)

This invention relates to vehicle braking devices and more particularly to an improved emergency brake operating means for trailers which includes operating means rendered effective in the event of breakaway of the trailer while being towed to set the trailer brakes and other means connectable with the emergency brake means of the towing vehicle effective to cause actuation of the trailer brakes by the vehicle emergency brake means simultaneously with the application of emergency braking force to the vehicle.

The principal object of the invention is to provide a trailer brake operating means effective to set the trailer brakes in the event of separation or breakaway while in transit and which additionally permits the operation of the trailer brakes during transit by the emergency brake system of the vehicle without interference with the normal operation of the trailer brakes by the service brake system of the vehicle.

Another object of the invention is to provide actuating means for trailer braking systems effective in the event of breakaway of the trailer in transit to set the trailer brakes which employs released pressure from a gas cartridge as the brake actuating force.

A further object of the invention is to provide a trailer brake actuating means energized by a compressed gas cartridge in the event of trailer breakaway which includes means for preventing accidental or inadvertent puncturing of the cartridge and which indicates that the pressure in the gas cartridge has been released.

Still another object of the invention is to provide a trailer brake actuating means which permits normal actuation of the trailer brakes by the service brake system and which permits actuation of the trailer brakes by actuation of the emergency brake system of the towing vehicle simultaneously with the actuation of the vehicle emergency brakes.

A still further object of the invention is to provide a means for actuating trailer brakes in the event of breakaway in transit in which the breakaway force is utilized to separate the hose connection between the vehicle brakes and the trailer brakes without subjecting the said hose and its connections to tension.

Still another object of the invention is to provide a trailer brake operating means in which all of the foregoing objectives are realized in practice which is simple in construction and susceptible of economical manufacture, is easily installed and connected with existing braking systems and which is reliable for its intended purpose.

With the foregoing object in view, together with such other objects and advantages as may subsequently appear, the invention resides in the parts, and in the construction, combination and arrangement of parts described, by way of example, in the following specification of a presently preferred embodiment of the invention; reference being had to the accompanying drawings which form a part of said specification and in which drawings:

Fig. 1 is a diagrammatic view of the connected braking systems of a towing vehicle and trailer showing the point of installation of the device embodying the invention and the connection thereof to the vehicle emergency brake, Fig. 2 is a side elevation of the connected portions of a vehicle and trailer with the embodiment of the invention installed between the vehicles, Fig. 3 is a side elevation of the brake actuator embodying the invention, Fig. 4 is an elevational view of the right hand or front edge of the actuator shown in Fig. 3, Fig. 5 is a top plan view of the device as shown in Fig. 3, Fig. 6 is a sectional view taken on the line 6—6, of Fig. 5 showing the device in normal position of use, Fig. 7 is a view similar to Fig. 6 but showing the respective positions of the parts at the instant of breakaway of the trailer, Fig. 8 is a view similar to the upper portion of Fig. 6 but showing the positions of the parts upon actuation of the vehicle emergency brake means, Fig. 9 is a top plan sectional view taken on the line 9—9 of Fig. 3, Fig. 10 is a partially exploded view of the component parts showing the mode of installation of an actuating gas cartridge in the device, and Fig. 11 is a sectional view of the emergency brake operating cam, shaft and lever taken on the line 11—11 of Fig. 3.

The illustrated embodiment of the invention comprises a body 1 having a vertical cartridge receiving bore 2 extending downwardly from the upper end thereof and a vertical cylinder bore 3 spaced from and extending parallel to the cartridge bore 2. The body 1 is rectangular in cross section as viewed in plan and adjacent the lower end thereof it is provided with a pair of spaced parallel bores 4, 4 through which bolts 5, 5 extend to secure the body to a trailer tongue TT of a trailer T connected by a hitch H to the bumper B of a towing vehicle V.

Braking fluid is conducted to the cylinder bore from the vehicle braking system through a hose H' having one end connected to the wheel brake lines L of the vehicle and the other end connected by a self sealing snap on coupling C detachably engaging a complementary fitting C' screwed into the port 6 in the body 1. The opposite end of the hose may be similarly connected to the vehicle brake system to permit removal from the vehicle when the trailer is not being towed. A duct 7 leads from the port 6 horizontally beneath the cartridge bore 2 and thence vertically between the bores 2 and 3 to the upper fluid level of the cylinder bore and thence laterally into the cylinder bore. The vertical portion of the duct may be conveniently formed by drilling a hole which intersects a hole extending laterally from the port 6 and closing the lower end of the vertical hole with a screw 8. The portion of the duct 7 entering the bore 3 may be formed by drilling a hole from the outer surface of the body 1 transversely across the upper end of the cylinder bore and thence intersecting the vertical bore portion of the duct. The outer portion of this hole may then be supplied with a bleed valve means 9 to permit the expulsion of air from the cylinder bore incident to filling the trailer brake system with hydraulic fluid. A duct 10 extends downwardly from the lower end of the cylinder bore 3 and thence laterally to a port 11 in the rear edge of the body 1 said port having one end of an angle valve 12 screwed therein with the opposite end connected to a tube 13 connected to the trailer brake cylinders TC. A valve stem 14 provides a means of closing the valve 12 for purposes to be later described.

The cylinder bore 3 contains a freely movable piston 15 having a lower gasket element 16 and an upper gasket 17 secured thereto by a screw 17'. A compression spring 18 reacting between the lower end of the cylinder bore and the lower face of a plug 18' filling the recess formed by the depending flange of the gasket 16 constantly urges the piston and its gaskets upwardly. At this point it is to be noted that in the normal position of the piston as shown in Fig. 6, and assuming that further upward movement of the piston is prevented by means to be later described, actuation of the vehicle service brake cylinders VC by the vehicle brake pedal P will simultaneously impose equal pressure through the hose H' and through the ducts 7 and 10 and the cylinder bore 3 to the trailer brakes.

The top of the body 1 is closed by a detachable cover 19 secured thereto by screws 20 with an interposed gasket 20' provided with openings in registry with the bores 2 and 3 and the cover is provided with a pair of spaced vertical wall members 21 and 22 extending upwardly from the top surface thereof and extending longitudinally of the top from points slightly inwardly from the front and rear ends of the cover. The cover 19 is provided with a vertical bore 23 extending therethrough which is smaller than and in axial alignment with the bore 3 in which the shank 24 of a plunger 25 is slidably mounted; said plunger having a head 26 which is larger than the shank 24 and smaller than the bore 3. Normally this plunger is pressed upwardly by the action of the spring 18 on the piston and its gaskets until a ring gasket 27 surrounding the shank 24 engages the under side of the cover 19 and by being clamped between the head 26 and the under surface of the cover 19 prevents leakage out of the bore 23.

Mounted for oscillation in aligned bores 28, 28 extending through the walls 21 and 22 in the axial line of the bore 3 is a rockshaft 29 to which a cam 30 is secured between the walls 21 and 22 adapted to engage to outer or upper end of the plunger shank 24. Externally of the wall 22, the shaft is provided with a hexagonal head 31 on which the end of a wrench member 32 is secured between a collar member 33 on the rockshaft 29 and washers 34 and 34' releasably engaging the outer face of the wrench by a screw 35 threadedly engaging the hexagonal head. The handle 36 of the wrench extends downwardly and rearwardly toward the trailer and is connected to one end of a flexible member 37 the other end of which is connected to the emergency brake operating means E of the towing vehicle so that upon setting the emergency brake, tension will be applied to the flexible member with resultant movement of the shaft 29 in a clockwise direction as viewed in Fig. 9 causing the cam 30 to depress the plunger 25 with consequent downward movement of the piston 15. The first portion of the piston movement will cause the gasket 16 to cut off the duct 7 and thereafter the continued downward movement will apply braking pressure to the trailer brakes, the piston and cylinder bore thus operating as a master cylinder. Thus when the vehicle and trailer are stopped, the setting of the hand brake thus also sets the trailer brakes. Further, and more important to safety, in the event of failure of the vehicle brakes while in transit, the vehicle and trailer may be driven and controlled by use of the emergency brake until a service facility is reached for repair of the vehicle braking system. The use of a wrench as the operating lever permits the wrench to be moved from one pair of opposed flat surfaces to another as the trailer brakes wear to maintain the movement of the lever within a fixed range and to allow ready and correct assembly of the apparatus without the necessity of closely relating some angular position of the shaft 29 with the high point of the cam 30.

The provisions for safety to this portion of the invention in the event of breakaway of the trailer will be described in connection with that portion of the invention, it being presently necessary only to note that the flexible member is led through a guiding eye 38 located adjacent to the point at which the hitch H pivots to preserve the effective length of the flexible member when the vehicles are disposed angularly to each other in making a turn, and in that a tension spring 39 extending between the end of the handle 36 and a point on the trailer tongue TT in rear of the device serves to urge the lever arm in a counter-clockwise direction and thus maintain the flexible member taut.

The cover 19 is provided with a bore 40 smaller than and disposed in the axial line of the bore 2 in which the shank 41 of a plunger 42 is slidingly mounted; said plunger below the cover having a head 43 sufficiently larger than the shank to provide a seat for a gasket 44 surrounding the shank; said head normally fitting in a counterbore 43' in the lower face of the cover 19. The lower face of the head 43 carries a depending piercing point 45 adapted to pierce the seal of a compressed gas cartridge 46 disposed in the bore 2. Suitable means is provided to normally urge the plunger 42 upwardly so that the point 45 is out of contact with the cartridge seal such as, for instance, a washer 47 loosely surrounding the neck portion of the cartridge and a light compression spring 48 extending between the washer and the lower face of the plunger head 43. A channel 49 is formed in the upper face of the body 1 between the bores 2 and 3 and upon placing the cover 19 and gasket 20' thereon, the channel becomes a duct extending between the bores 2 and 3.

Disposed between the walls 21 and 22 and pivoted on a bolt 50 mounted in said walls above and slightly forwardly of the axial line of the bore 40 is a cam member 51 having a curved face 52 effective upon being given a clockwise movement about the bolt 50 as viewed in Fig. 7, to depress the plunger 42 with consequent puncturing of the seal of the the gas cartridge 46. The cam member 51 extends forwardly beyond the front end of the body 1 and carries an arm 53 depending normally in close parallel relation to the edge of the body 1 and terminates in a forked lower end 54 which straddles the fitting C in rear of the end face of the connector C'. The cam member with its integral arm 53 are held in the above described position by a shear pin 55 extending through aligned holes in the wall members 21 and 22 and the cam member 51. A chain 56 loosely connects the arm 53 with the bumper of the towing vehicle; said chain having sufficient strength in the event of breakaway separation of the trailer from the vehicle to cause the cam member to shear the pin 55 and then effect the puncturing of the gas cartridge and then to rupture incident to the separation of the vehicles. Incident to this movement, the arm 53 will separate the interengagement of the self sealing connectors C and C' by forcing the connector C' forwardly. This, it is to be noted, is by pushing the connector C' off and thus there is no tension strain applied to the hose H'.

The release of the compressed gas causes a flow of pressure through the channel 49 into the bore 3 above the piston 15 and gasket 17 forcing the piston downwardly and thus causing the application of braking pressure to the trailer brakes, the said downward movement of the piston serving to cut off communication through the duct 7 as before described. Since the heads of the plungers 25 and 42 are subjected to greater total pressure on their lower faces than on the portions thereof surrounding the shanks, they will be moved upwardly effectively sealing the bores through which they extend. As soon as the chain 56 is ruptured, the pressure on the plunger 42 causes it to move the cam member back to approximately its normal position due to the fact that the pivot point is disposed forwardly of the axial line of the plunger. The chain 56 may be either of sufficient strength to perform the required actuation and be subject to rupture or it may be a stronger chain or cable made in two parts connected by a weaker link whose point of rupture is a known factor. The same considerations apply to the flexible member 37 which operates the emergency braking efforts of the device except that the connecting link being subjected to braking efforts must be of sufficient strength to withstand those efforts. This point of rupture may conveniently be combined with means for separating the member 37 incident to intended uncoupling such as a snap hook 58 on one portion of the member detachably engaging a malleable link 59 on the other portion which is pulled to open position in the event of breakaway separation. To protect the emergency braking portion of the device in the event of trailer breakaway, the body member 1 is provided with a laterally extending lug 57 disposed in the path of movement of the lever arm 36 and beyond the limit of its movement when used for emergency braking. In the event of trailer breakaway, the member 37 will pull the arm 36 until it contacts the lug 57 which prevents further movement of the arm and thus causes rupture of the member 37 without damage to the device. In this action, the piston 15 will of course be depressed and the pressure applied by this movement will be added to the pressure applied by the released gas. Thus, at the time extreme braking action is required, the two portions of the device act additively and as the trailer slows down and the member 37 is ruptured, the braking action is transferred to the effect of the compressed gas which has been released. If the trailer is to stand where it stops after a breakaway, the valve 12 is closed thus sealing off the brakes from the actuating cylinder. When the trailer is normally uncoupled and it is desired to set the brakes, the lever arm 36 is moved manually to effect the braking action and while so held the valve 12 is closed.

After breakaway actuation of the device, it is necessary to replace the cartridge with a new one. This is accomplished by removing the cover and replacing the cartridge in the bore 2. If the device is still subject to internal pressure, the arm 53 can be pulled outwardly slightly to depress the plunger 42 and thus break the seal of the gasket 44 whereupon, the pressure can escape past the shank of the plunger 42 to atmosphere. After the cover has been replaced, or as an incident to the replacement of the cartridge at any time during the replacement, the portions of the shear pin 55 are removed and replaced by a new pin.

Thus there has been provided a safety brake operator for trailer brakes which operates quickly and surely in the event of trailer breakaway and which further can be employed to substitute for the brakes of the towing vehicle if those brakes give out while in transit. Further it is capable of responding to the emergency brake operation of the towing vehicle even if the emergency brake of the vehicle should be inoperative. Still further, the device can be employed to serve as a parking brake operator for an uncoupled trailer. Moreover the device can be installed on any trailer having hydraulic brakes without the necessity of any alteration of the trailer braking system or of the trailer brake connection of the towing vehicle. The gas released from the cartridge is confined to a very small space with resultant retention of maximum pressure when released. It is readily installed since the holes for the mounting bolts can serve as guides for drilling the holes for the mounting bolts. No special skill is required for the installation since there are no critical dimensions or the like to be observed in making the installation and it can be located at any convenient place along the trailer tongue. Other advantages have been pointed out during the course of the description.

The terms "front," "rear," "top," "bottom," "above," "below" and the like have been employed as convenient means in connection with the description of the invention as disclosed in the drawings and these or like terms are not to be deemed to be words of limitation.

While in the foregoing specification there has been described a presently preferred embodiment of the invention, such disclosure has been by way of example.

Accordingly, it will be understood that the invention is not to be deemed to be limited to the exact embodiment so disclosed, and it will be understood that the invention embraces all such changes and modifications in the parts, and in the construction, combination and arrangement of parts as shall come within the purview of the appended claims.

I claim:

1. An emergency actuator for hydraulic brakes on trailers normally actuated by conduit means extending from the braking system of the towing vehicle; said actuator comprising a body member mounted on the trailer and having a cylinder enclosed therein, a piston reciprocable in said cylinder, spring means constantly urging said piston to a normal position at one end of said cylinder, fluid conducting means affording communication between the conduit means and the end of said cylinder adjacent to said piston, other fluid conducting means affording communication between the opposite end of said cylinder and the brake actuating cylinders of the trailer whereby a continuous fluid path is provided through which, under normal conditions the trailer brakes may be actuated simultaneously with and by the service braking system of the towing vehicle; said piston, upon being moved in opposition to said spring means, being effective to cut off fluid flow through said first named fluid conducting means and impose braking pressure on the trailer brakes, means operable to cause said piston to actuate the trailer brakes connected to the emergency brake system of the towing vehicle, and other means separately actuated by breakaway separation of the trailer from the towing vehicle effective to move said piston in opposition to said spring means including a normally sealed cartridge of compressed gas, means enclosing said cartridge and having communication with said cylinder at the side of said piston opposite the side contacting fluid in said cylinder, and devices actuated by breakaway separation of the trailer operating to release the gas from said cartridge with resultant imposition of the pressure of the released gas on said piston and consequent application of braking effort to the trailer brakes.

2. A trailer brake actuating means as claimed in claim 1 in which said gas releasing devices operate additionally to simultaneously effect disconnection of the conduit means from said body member.

3. A trailer brake actuator as claimed in claim 1 in which said gas releasing devices include a reciprocable plunger mounted in said cartridge enclosing means and having a pointed portion adapted to pierce said cartridge and means actuated by breakaway separation of the trailer and towing vehicle effective to cause relative movement between said plunger and said cartridge with resultant piercing of said cartridge and release of gas contained therein.

4. An emergency actuator for hydraulic brakes on trailers normally actuated by conduit means extending from the braking system of the towing vehicle; said actuator comprising a body member mounted on the trailer and having a cylinder enclosed therein, a piston reciprocable in said cylinder, spring means constantly urging said piston to a normal position at one end of said cylinder, fluid conducting means affording communication between the conduit means and the end of said cylinder adjacent to said piston, other fluid conducting means affording communication between the opposite end of said cylinder and the brake actuating cylinders of the trailer whereby a continuous fluid path is provided through which, under normal conditions, the trailer brakes may be actuated by the service braking system of the towing vehicle; said piston, upon being moved in opposition to said spring means, being effective to cut off fluid flow through said first named fluid conducting means and impose braking pressure on the trailer brakes, and devices mounted on said body and connected to the emergency brake operating means of the towing vehicle effective upon operation of the emergency brake means to cause movement of said piston in opposition to the bias of said spring means with resultant cutting off of the fluid flow through said first named fluid conducting means and imposition of braking effort on the trailer brakes independently of operation of the service braking system of the towing vehicle.

5. A trailer brake actuating means as claimed in claim 4 in which said piston actuating devices comprise a plunger mounted in said body member and engaging the side of said piston opposite the fluid contacting side thereof, a cam mounted exteriorly of said body member and engaging said plunger, an arm operably connected to said cam, a flexible member extending between the emergency brake operating means of the towing vehicle and said arm, and spring means normally maintaining said arm in a position in which said piston is allowed to occupy its normal position in response to the urging of said first named spring means.

6. In an emergency actuator for hydraulic brakes on a trailer, a body member mounted on the trailer, a fluid containing cylinder in said body member having a piston reciprocable therein, spring means constantly urging said piston toward one end of said cylinder, fluid conducting means affording communication between the other end of said cylinder and the trailer brake cylinders, an enclosed cavity in said body member housing a cartridge of compressed gas and having communication with the portion of said cylinder at the side of said piston remote from said fluid conducting means, and devices actuated by breakaway separation of the trailer from a towing vehicle effective to release the gas from said cartridge with resultant imposition of pressure on said piston by the released gas in excess of the bias of said spring means and consequent application of braking effort by the trailer brakes independently of the braking system of the towing vehicle; said body member carrying other devices connected by a rupturable member with the emergency brake operating means of the towing vehicle, said other devices being effective upon actuation of the emergency brake actuating means to engage said piston with resultant actuation of the trailer brakes.

7. In an emergency actuator for hydraulic brakes on a trailer, a body member mounted on the trailer, a fluid containing cylinder in said body member having a piston reciprocable therein, spring means constantly urging said piston toward one end of said cylinder, fluid conducting means affording communication between the other end of said cylinder and the trailer brake cylinder, an enclosed cavity in said body member housing a cartridge of compressed gas and having communication with the portion of said cylinder at the side of said piston remote from said fluid conducting means, and devices including mechanism carried by said body member and actuated by breakaway separation of the trailer from a towing vehicle effective to release the gas from said cartridge with resultant imposition of the pressure of the released gas on said piston in excess of the bias of said spring means and consequent application of braking effort by the trailer brakes independently of the braking system of the towing vehicle; said body member being provided with a removable cover carrying said gas releasing devices and carrying other devices connected to the emergency brake operating system of the towing vehicle effective upon operation of the emergency brake system of the towing vehicle to cause said piston to impose braking effort on the trailer brakes.

8. A trailer brake actuating means as claimed in claim 7 in which said gas releasing devices and said emergency brake operated devices each includes a plunger reciprocable in and extending through said cover and in which each plunger includes an enlarged head within said body member, and gaskets interposed between the head of each of said plungers and the inner face of said cover; said plungers when subjected to the pressure of released gas, being moved toward said cover with resultant engagement of said gaskets between the plunger heads and the inner face of said cover and sealing of the openings through which said plungers extend.

9. An actuator for hydraulic brakes on trailers comprising a body member mounted on the trailer, a fluid containing cylinder in said body member, a piston mounted for reciprocation in said cylinder, a spring means constantly urging said piston toward one end of said cylinder, fluid conducting means connecting the opposite end of said cylinder with the brake actuating cylinders of the trailer brakes, devices carried by said body member and connected to the emergency brake operating means of the towing vehicle effective upon actuation of the towing vehicle emergency brake to move said piston toward the opposite end of said cylinder with resultant application of braking effort to the trailer brakes, and other means carried by said body member and separately connected to the towing vehicle effective in the event of breakaway separation of the trailer and towing vehicle to separately actuate said piston to impose braking effort on the trailer brakes.

10. An actuator for trailer brakes as claimed in claim 9 in which said body member includes fluid conducting means extending between said cylinder at a point adjacent the fluid contacting face of said piston when subjected only to the bias of said spring means to a fitting disposed exteriorly of said body member and engageable by one end of a fluid conduit extending from and affording communication with the hydraulic braking system of the towing vehicle and in which the initial movement of said piston induced by either piston actuating means serves to move across the orifice of said last named fluid conducting means and prevent fluid flow therethrough.

11. In a trailer brake actuating device, a body member mounted on the trailer, a cylinder in said body having a port affording fluid transmitting connection with the braking system of a towing vehicle through a first conduit means extending from the towing vehicle braking system to a detachable connection with said port, a piston in said cylinder, other fluid conduit means extending from said cylinder to the trailer brakes, and devices carried by said body and connected to the towing vehicle by a rupturable member effective in the event of breakaway separation of the trailer from the towing vehicle and prior to the rupture of said member, to simultaneously disconnect said first fluid conduit means from said port at said detachable connection, close said port against loss of fluid from the trailer brake system, and apply an elastic force on said piston with resultant application of braking effort to the trailer brakes through the fluid contained in said cylinder and the trailer braking system.

References Cited in the file of this patent

UNITED STATES PATENTS

| | | |
|---|---|---|
| 1,762,699 | Sanford | June 10, 1930 |
| 2,183,371 | Stromberg | Dec. 12, 1939 |
| 2,254,890 | Gardiner | Sept. 2, 1941 |
| 2,776,734 | Hackett | Jan. 8, 1957 |
| 2,814,363 | Phillips | Nov. 26, 1957 |